(12) United States Patent
Engst et al.

(10) Patent No.: US 11,764,718 B2
(45) Date of Patent: Sep. 19, 2023

(54) ENERGY STORAGE DEVICE FOR ELECTRIC DRIVE SYSTEMS

(71) Applicant: Liebherr-Components Biberach GmbH, Biberach an der Riss (DE)

(72) Inventors: Christian Engst, Öpfingen (DE); Harald Wanner, Attenweiler (DE); Sven Welser, Äpfingen (DE); Michael Schuler, Biberach an der Riss (DE); Josef Gleinser, Steinhausen (DE)

(73) Assignee: Liebherr-Components Biberach GmbH, Biberach an der Riss (DE)

(*) Notice: Subject to any disclaimer, the term of this patent is extended or adjusted under 35 U.S.C. 154(b) by 503 days.

(21) Appl. No.: 17/122,938

(22) Filed: Dec. 15, 2020

(65) Prior Publication Data
US 2021/0143765 A1    May 13, 2021

Related U.S. Application Data

(63) Continuation of application No. PCT/EP2019/065565, filed on Jun. 13, 2019.

(30) Foreign Application Priority Data

Jun. 15, 2018 (DE) ..................... 10 2018 114 405.9

(51) Int. Cl.
| | | |
|---|---|---|
| H02P 27/06 | (2006.01) | |
| H01M 10/42 | (2006.01) | |
| H02J 7/00 | (2006.01) | |

(52) U.S. Cl.
CPC ........ H02P 27/06 (2013.01); H01M 10/4257 (2013.01); H02J 7/0029 (2013.01)

(58) Field of Classification Search
CPC .......... B60L 50/61; B60L 50/66; B60L 50/40; B60L 53/11; B60L 2210/14; B60L 15/20;
(Continued)

(56) References Cited

U.S. PATENT DOCUMENTS

2009/0212626 A1 * 8/2009 Snyder ................ B60L 15/209
                                                           903/930
2011/0094841 A1    4/2011 Mazumdar et al.
(Continued)

FOREIGN PATENT DOCUMENTS

DE    102013215012    2/2014
DE    102013201221    7/2014
(Continued)

*Primary Examiner* — Antony M Paul
(74) *Attorney, Agent, or Firm* — Levine Bagade Han LLP

(57) ABSTRACT

The present invention relates to an energy storage device, comprising power terminals for connecting to a voltage circuit of power electronics of a drive system, which drive system can be controlled by an external system controller as well as at least one electrical storage block; at least one power converter for connecting the voltage circuit of the power electronics of the drive system to an internal voltage circuit of the storage block; and a control device for controlling the at least one power converter. Said control device has a controller board having output and/or feed-in control means for controlling the power converter for the outputting of current from/feeding of current into the storage block, and/or voltage closed-loop and/or open-loop control means for the closed-loop and/or open-loop control of the output voltage of the energy storage device. According to the invention, said control device has an adaptation board, which is connected to the controller board. The adaptation board comprises a plurality of connection terminals for differently designed external system controllers, at least one communication interface for communicating with the controller board of the control device, and at least one adaptation circuit for adapting and transferring signals between the connection terminals of the adaptation board and the controller board.

21 Claims, 6 Drawing Sheets

(58) Field of Classification Search
CPC .. B60L 50/51; B60L 7/14; B60L 53/20; B60L 7/06; B60L 2210/40; B60L 58/22; B60L 2210/30; B60L 2200/40; B60L 2240/529; B60L 2240/527; B60L 2210/12; B60L 2210/42; B60L 2220/14; B60L 2240/42; B60L 2240/429; B60L 2260/42; B60L 50/60; B60L 7/10; H02K 11/33; H02P 27/00; H02P 27/04; H02P 27/06; H02P 27/08; H02P 29/00; H02P 29/032; H02P 2201/03; H02P 2201/07; H02P 2205/01; H02P 2207/01; H02P 2207/05; H02P 2209/05; H02P 9/00; H02P 11/00; H02P 11/04; H02P 21/00; H02P 21/22; H02P 21/14; H02P 23/00; H02P 23/14; H02P 25/022

See application file for complete search history.

(56) References Cited

U.S. PATENT DOCUMENTS

| | | |
|---|---|---|
| 2012/0331195 A1 | 12/2012 | Pipho et al. |
| 2017/0106764 A1 | 4/2017 | Beaston et al. |
| 2018/0022221 A1 | 1/2018 | Kusch et al. |

FOREIGN PATENT DOCUMENTS

| | | |
|---|---|---|
| DE | 102013009823 | 12/2014 |
| DE | 102016223154 | 5/2018 |
| WO | WO 2017/139682 | 8/2017 |
| WO | WO 2019/238860 | 12/2019 |

* cited by examiner

ENERGY STORAGE DEVICE FOR ELECTRIC DRIVE SYSTEMS

CROSS-REFERENCE TO RELATED APPLICATIONS

This application is a continuation of International Patent Application Number PCT/EP2019/065565 filed Jun. 13, 2019, which claims priority to German Patent Application Number DE 10 2018 114 405.9 filed Jun. 15, 2018, the contents of which are incorporated herein by reference in their entireties.

BACKGROUND

The present invention relates to an energy storage device, comprising power terminals for connecting to a voltage circuit of power electronics of a drive system, which drive system can be controlled by an external system controller as well as at least one electrical storage block; at least one power converter for connecting the voltage circuit of the power electronics of the drive system to an internal voltage circuit of the storage block; and a control device for controlling the at least one power converter. Said control device has a controller board having output and/or feed-in control means for controlling the power converter for the outputting of current from the storage block to the drive system, and/or for the feeding of current from the drive system into the storage block and with voltage closed-loop and/or open-loop control means for the closed-loop and/or open-loop control of the output voltage of the energy storage device.

The invention further relates to a drive system with power electronics to which such an energy storage device is connected, the control device of which communicates with the higher-level system control of the drive system. Such electrical drive systems can be used, for example, with lifting apparatus, in particular elevators such as passenger and/or goods elevators, but also cranes such as container bridge cranes or construction machinery such as concrete-mixer vehicles, earthmoving and mining machines such as surface milling cutters, but generally also with other mobile machinery or also machinery connected to the grid. In particular, such drive systems can be passenger and/or goods elevators which are used in or on buildings such as, for example, high-rise buildings, or other lifting apparatuses which lift and lower loads cyclically.

To save energy more and more drives which were previously driven mechanically or hydraulically are being electrified to be able to utilize the better efficiency of electric motors. This is particularly useful in applications with cyclically recurring acceleration and braking phases or uphill and downhill driving, where it makes sense to integrate or connect an energy storage device into the drive system so that during acceleration or uphill phases energy is made available while during braking or downhill phases the energy released is fed back and stored in the at least one storage block, for which capacitors, especially double-layer capacitors, but also other battery systems or accumulators are suitable. Depending on the drive system, considerable amounts of energy arise, they have to be made available and temporarily stored, causing conventional energy storage systems to quickly reach their limits or require an intelligent control system in order to cope with the requirements.

In order to adapt the voltage provided or the current output by the at least one storage block to the respective drive system and the voltage and/or current demand thereof and/or conversely to adapt the current fed back from the drive system to the conditions of the internal voltage circuit of the storage block, the energy storage device can have at least one power converter module in order to adapt the current made available or fed in with regard to the characteristic parameters such as voltage and/or frequency in the required manner.

If, for example, such dual-layer capacitors are used as energy stores, so-called DC/DC converters or DC/DC transformers are required since the voltage over a dual-layer capacitor varies in dependence on a filling level. Said DC/DC transformer connects the dual-layer capacitor storage module to the drive elements or to the frequency inverter normally connected thereto and ensures the exchange of energy. Such DC/DC transformers or DC/DC converters designate an electric circuit which can convert a DC voltage supplied at the input into a DC voltage having a higher, lower or inverted voltage level and which is able to transfer energy from the high voltage level into the lower voltage level, for example to charge the energy storage block, and likewise to transfer energy in the other direction, e.g. to withdraw it, or to transfer it from the storage block into the DC voltage circuit of the drive system.

However, depending on the storage block and drive system, other power converters such as rectifiers, inverters, frequency converters or generally converters can also be used. Such power converters can include electronic components such as diodes, transistors or thyristors, but also MOSFETS, IGBTs or IGCTs.

The linking of such an energy storage device having, in particular, a dual-layer capacitor to the respective drive system is, however, more or less complex and/or expensive since the individual modules of such an energy storage device typically have to be laboriously configured together and have to be adapted to the framework conditions of the drive system, for example to its electric motor and power electronics. In this respect, a user or an application engineer is as a rule forced to deal with the complex internal routines in the energy store and in the DC/DC converter to be able to make the necessary designs with respect to the modules and to the internal operation. In addition, there is cabling work, which is more or less complex and/or expensive depending on the drive and the used unit, including high-current lines, bus wiring and SPS signals. At the same time, care must be taken with the initially named used unit that the energy storage device has to withstand the rough operating conditions such as dust exposure and impact loads and vibration loads.

SUMMARY

Starting from this, it is the underlying object of the present disclosure to provide an improved energy storage device of the initially named kind as well as an improved drive system having such an energy storage device, to avoid the disadvantages of the prior art and to further develop the latter in an advantageous manner. The linking of the energy storage device to a respective drive system should in particular be dramatically simplified and in this respect the buffering and subsequent output of the electrical energy into and out of the energy store should nevertheless be designed efficiently and reliably.

Said task is solved in accordance with the present disclosure by the energy storage device as claimed in claim 1 and by the drive system having such an energy storage device as claimed in claim 18. The use of such a drive system in a lifting apparatus as claimed in claim 21 is furthermore a subject-matter of the present disclosure.

It is therefore proposed to combine the electric components of the energy storage device to a plug-and-play module which can be simply connected by user in the manner of a black box on the one hand simply with the power terminals to the power electronics or the voltage circuit of the drive system, and on the other hand with its integrated control device, which controls the at least one power converter for the outputting and/or feeding and/or the output voltage of the storage device, which can be connected to the higher-level control device of different drive systems and which can exchange the parameters and signals required by the respective higher-level control device. According to the invention, said control device has an adaptation board, which is connected to the controller board. The adaptation board comprises a plurality of connection terminals for differently designed external system controllers, at least one communication interface for communicating with the controller board of the control device, and at least one adaptation circuit for adapting and transferring signals between the connection terminals of the adaptation board and the controller board. Using the multiple, differently designed connection terminals of the adaptation board, the control device integrated in the energy storage device can be connected in a simple manner to differently designed, external system controllers.

Depending on how the external system controller is designed, the signals, data formats and/or parameters required or provided by the external system controller can be received or transmitted or provided via the respective matching connection terminal of the adaptation board. So that the signals, data and/or parameters provided by the controller board can also be used by the external system controller or, conversely, signals, data, commands or parameters provided by the external system controller can be used by the controller board, the at least one adaptation circuit of the adaptation board adapts the said signals, data, commands and/or parameters with regard to their format and/or voltage level and/or with regard to their transmission paths to the respective connection terminal and/or to the communication interface of the adaptation board, so that the controller board can communicate with differently designed, higher-level external system controllers.

Advantageously, the adaptation board can comprise a plurality of adaptation circuits, of which a respective matching circuit can adapt the respective required signals, data and/or parameters from/to the respective external system controller.

In further development of the invention said adaptation board can further comprise a plurality of sensor connections for connection to different sensors which are required for the system controller and/or for the internal control device. In particular the adaptation board can be connected by means of said sensor connections, on the one hand, to energy storage devices internal sensors by means of which the energy storage device, in particular the storage block thereof and/or at least one operating state on the power converter and/or on the internal voltage circuit is monitored. Alternatively or additionally, the adaptation board can be connected via said sensor connections to external sensors that monitor at least one operating state of the drive system to be connected or the power electronics thereof.

For example, to the sensor connections of the adaptation board there can be connected cooling device sensors for monitoring a cooling device, for example a coolant flow rate and/or mass sensor and/or a temperature sensor, and/or a current and/or voltage sensor for monitoring a current flow and/or voltage in the voltage circuit of the drive system to be connected and/or in the internal voltage circuit of the storage block, and/or a degree of symmetry sensor for monitoring the symmetry of a plurality of memory blocks.

Said at least one adaptation circuit of the adaptation board can, for example, comprise one or more hardware components in the form of electronic modules such as semiconductor modules, but can also alternatively or additionally comprise one or more software modules that can be stored in a storage module and processed in a processor.

In particular, the adaptation board can also comprise several such hardware circuits and/or software modules.

With the aid of said adaptation board, a controller board adapted to the storage block and its circuit can be used and still be adapted to various higher-level system controllers and used together with them. Said adaptation board can be releasably connected to said controller board via one or more plug-in connections. Alternatively or additionally, the adaptation board can also be hardwired to the controller board.

Said controller board can advantageously comprise at least one microcontroller, at least one FPGA module, i.e. a Field-Programmable Gate Array, furthermore hardware circuits and plug-in connections for contacting and/or consist of said modules. Said hardware circuits of the controller board can comprise electronic components such as semiconductor components, transistors, diodes or other active or passive components, wherein on the controller board there can be provided in particular also integrated circuits. Alternatively or additionally to the said hardware circuits, however, the controller board can also comprise at least one software module which is stored in a storage module and interacts with the microcontroller or is processed thereby.

In further development of the invention, the control device integrated in the energy storage device can further comprise a communication board which is provided to enable fieldbus communication for the control device, in particular with signal-emitting and/or with signal-processing components of the energy storage device, such as sensors, and/or with signal-emitting and/or signal-processing components of the drive device to be connected and/or of the external system control, such as sensors installed on the drive device.

The said communication board can advantageously have plug-in connections and be plugged onto the controller board.

Advantageously, in said controller board, there can be implemented and/or preprovided a variety of control functions that enable the control device to control the energy storage device for a variety of different drive devices and different external control systems, and to perform corresponding control functions depending on which control function is required by the drive device and/or the external control system.

Translated with www.DeepL.com/Translator (Free Version)

In particular, the control device of the energy storage device can comprise control means for controlling the operation of the at least one storage block, wherein said state control means for the operation of the energy storage device can advantageously be configured to perform an automatic precharging of an internal intermediate circuit and/or an automatic connection and disconnection to an external intermediate circuit of the drive system and/or an automatic precharging to a preferably parameterizable initial voltage.

Alternatively or additionally, the integrated control system can comprise detection means for detecting various sensors, for example at least one voltage sensor and/or at least one current sensor and/or at least one temperature sensor or at least one flow sensor, by means of which corresponding operating variables of the energy storage device and/or the drive system can be measured.

Alternatively or additionally, the control device of the energy storage device can comprise power control means for generating control signals for the power electronics of the drive system.

Alternatively or additionally, the control device can comprise a controller for regulating the current in the storage block.

Alternatively or additionally, the integrated control device can include operation control instruments for setting or controlling different mode of operation of the energy storage device, wherein said operation control instruments comprise at least one controller for closed-loop control of an intermediate circuit voltage and/or a controller for closed-loop control of an intermediate circuit voltage with desired value window and/or a controller for closed-loop control of an intermediate circuit current and/or a controller for closed-loop control of a power and/or a controller for closed-loop control of a charge state and/or control means for active discharging of the storage block.

Alternatively or additionally, the integrated control device can comprise a self-test module for self-testing the power electronics.

Alternatively or additionally, the integrated control device can comprise at least one limiter module which is provided and designed to limit or change at least one characteristic manipulated variable of the energy storage device and/or of the drive device when storage voltage limits are reached and/or when storage current limits are reached and/or when intermediate circuit current limits are reached and/or when intermediate power limits are reached and/or when temperature limits are reached, for example to limit or reduce an output or fed-in current and/or a voltage level.

Such a limiter module can advantageously be designed to be parameterizable in order to be able to define the corresponding voltage limit and/or current limit and/or power limit and/or temperature limit in an adjustable manner.

Alternatively or additionally, said control device of the energy storage device can comprise at least one monitoring module configured to detect an overcurrent in the energy storage device and/or an overvoltage in an intermediate circuit and/or a voltage in the energy storage device and/or a voltage in the at least one storage block, and/or an overtemperature, for example in the cooling water of a cooling device and/or in the at least one storage block and/or in an interior space of the energy storage device and/or at at least one choke, and/or a state of at least one relay and/or a cooling device, for example with regard to coolant flow and/or a cooling unit state, and/or power electronics and/or a storage state and/or a balancing function of the storage blocks. Alternatively or additionally, monitoring means can be provided for monitoring the remaining life of the energy storage device and/or the at least one storage block, wherein such monitoring means can calculate and/or estimate said remaining life.

Alternatively or additionally, said communication board and/or said adaptation board can comprise a fieldbus communication module for a fieldbus communication to external control systems, wherein the fieldbus communication module can be provided, for example, to define a mode of operation and/or to define a start or stop of the drive device and/or to define a desired value for a respective mode of operation and/or to define variable limits during an operation and/or to define a pre-control value for a control and/or mode of operation and/or to read out a current status of the energy storage device and/or to read out and provide current operating data.

Alternatively or additionally, said control device of the energy storage device can comprise a statistics module for determining and/or storing statistical data, for example a time distribution of a storage temperature and/or a time distribution of a power and/or a time distribution of a current in the energy storage device and/or a time distribution of a voltage in the energy storage device.

Alternatively or additionally the control device can comprise a master/slave control device for operating a plurality of storage blocks in a master/slave mode, wherein the master/slave control device advantageously comprises communication means allowing a plurality of energy storage units to communicate with each other preferably via a CAN BUS, and/or synchronization means for synchronizing the voltage of the plurality of parallel-connected energy storage units, and/or apportioning control means for equal apportioning of the current in the parallel-connected energy storage units.

Alternatively or additionally, said control device can comprise operational data transmission means for transmitting operational data of the at least one energy storage device to a central server and/or a cloud.

In an advantageous further development of the invention, the internal control device of the energy storage device, in particular at least one of said control means, can be designed to be parameterizable in order to be able to change said functionalities via corresponding specification of parameters. A parameterization module can advantageously communicate via a USB interface and/or a Profinet interface with an external or internal parameterization device, for example a PC program OPAL, in order to carry out the desired parameterization.

Advantageously, at least one of the following functionalities can be parameterized or adapted by means of said parameterization module:
- at least one communication parameter,
- at least one parameter of the power electronics, as for example the maximum current, a minimum and/or maximum voltage, at least one sensor, at least one switching time and/or at least one switching frequency,
- at least one operating mode, for example control mode via a field bus and/or master/slave mode and/or error reaction mode,
- at least one monitoring function, as for example defining a limit value for a cooling device and/or a balancing function and/or a voltage, and/or at least one threshold value for current and power of the energy storage device and/or the drive device,
- nominal values of the energy storage device, as for example nominal capacity and/or nominal current and/or inductance,
- a setting of at least one controller.

Said energy storage device can be basically different, for example a storage cell can be a battery and/or a capacitor. Particularly advantageously, the control device described above can also find its use in a memory unit of bipolar design.

In further development of the invention, the energy storage device can comprise a DC/DC controller that is bidirectional so that it can both charge the storage block as well as provide power from the storage block, wherein the control unit of the energy storage device has output and feed control means for controlling the DC/DC converter both on the outputting of power from the storage block to the DC voltage circuit and on the feeding of power from the DC voltage circuit into the storage block, and said DC/DC converter, the storage block and the control unit are combined into an energy storage unit having a common housing in which the DC/DC converter, the storage block and the control unit are received and at whose outer side two connections are provided for connecting to the DC voltage circuit. Both the feed and the output of current into or out of the storage block therefore take place via the DC/DC converter which controls both the current output and the feed so that a simple link to the DC voltage circuit of the drive system is possible. In this respect, the energy storage device forms an integral overall system which combines the participating and required components in a single housing into which the control for the energy management is also installed. Only the two connections present at the outer housing side essentially have to be connected to the DC voltage circuit of the drive system, wherein the control unit in the interior of the housing of the energy storage device adapts the required control and regulation parameters to the drive system.

The storage block of the energy storage device can in particular comprise at least one capacitor, optionally in the form of a dual-layer capacitor, for energy storage, wherein in principle, however, at least one battery or rechargeable battery can also be provided in addition or alternatively to such one or more capacitors.

To avoid thermal problems of the energy storage device, the at least one storage block and/or the DC/DC converter and/or the control unit can be connected in the interior of the common housing to a cooling circuit which can optionally have coolant connections at the housing for connection to an external cooling circuit to lead the heat entering into the coolant out of the storage block and/or the DC/DC converter and/or the control unit from the housing and to be able to output it externally. To allow a simple assembly, the named coolant connections can be configured as pluggable so that only the coolant lines of the external cooling circuit have to be connected to the housing of the energy storage device.

Advantageously the internal and/or external cooling circuit and its components such as coolant circulators, cooling air fans, switchover valves, flow controllers and the like are controlled by the control unit in the interior of the energy storage device in dependence on the temperature, in particular in dependence on the temperature of a component in the interior of the housing of the energy storage device and/or on an environmental temperature. For this purpose, at least one temperature sensor can be provided and can be connectable to the control unit, said temperature sensor measuring the named component temperature and/or environmental temperature and/or the temperature of the housing interior. Alternatively or additionally, the control unit can be connectable to a flowmeter to be able to regulate the flow quantity of the cooling medium.

To be able not only to simply plug the coolant lines to the housing, the electric connections and/or the signal connections of the energy storage device can also be formed as pluggable or as plugs at the outer side of the housing so that the corresponding power lines or signal lines only have to be plugged in.

To allow a simple handling and a simple transport of the energy storage device, the housing into which the components of the module are integrated can be formed as divisible and can comprise a plurality of housing parts which can be put together to form a common housing into which at least the DC/DC converter, the storage block and the control unit are integrated. Different electrical components which can be connected to one another by releasable connection means, in particular plug-in contacts, on the putting together of the housing parts can be accommodated in the different housing parts. For example, plug connection parts can be attached to the interfaces of the housing parts or elsewhere such that, on the putting together or joining together of two housing parts, the plug-in connections are automatically also closed or come into engagement to connect together the electronic components which are accommodated in the two housing parts.

To ensure a secure, safe use of the energy storage unit, a warning signal device can be provided in a further development of the present disclosure to output a warning signal when the energy storage unit is still charged with energy and in this respect voltage can still be applied at the outer connection contacts and thus a possible dangerous potential is present. The warning signal device can, for example, be visually configured and can provide a warning signal visible from the outside, but can optionally also work acoustically or in another manner.

Alternatively or additionally to such a warning signal device, an electrical disconnect switch can advantageously also be provided for disconnecting the storage block and/or for deenergizing the connections at the housing, wherein the named disconnect switch can be formed internally or in the interior of the housing of the energy storage unit as a disconnect circuit. The connections led out of the energy storage system can be deenergized voltage-wise with the aid of such an electric disconnect switch, whereby the danger potential is considerably reduced.

Alternatively or additionally, the energy storage device can also comprise an integrated discharge circuit which can advantageously be actuable from the outside or can convert the energy still contained in the storage block into heat on a command from the outside. Accordingly, the storage block can be discharged by a control signal which can be given to the energy storage unit from the outside, for example wen the energy storage device should be decoupled from the drive system.

The housing can advantageously be formed in a sufficiently high IP safety class which allows the use of the storage system outdoors. The energy storage device is advantageously mechanically configured such that it can also be used under high vibration loads such as occur with mobile work machines such as construction machinery and cranes or by a correspondingly strong design of the housing and/or a damping embedding of the electrical components in the housing and/or a suitable design of the electrical components themselves.

BRIEF DESCRIPTION OF THE DRAWINGS

The invention is explained in more detail below on the basis of preferred exemplary embodiments and the corresponding drawings. The drawings show.

DETAILED DESCRIPTION

Figure 6:
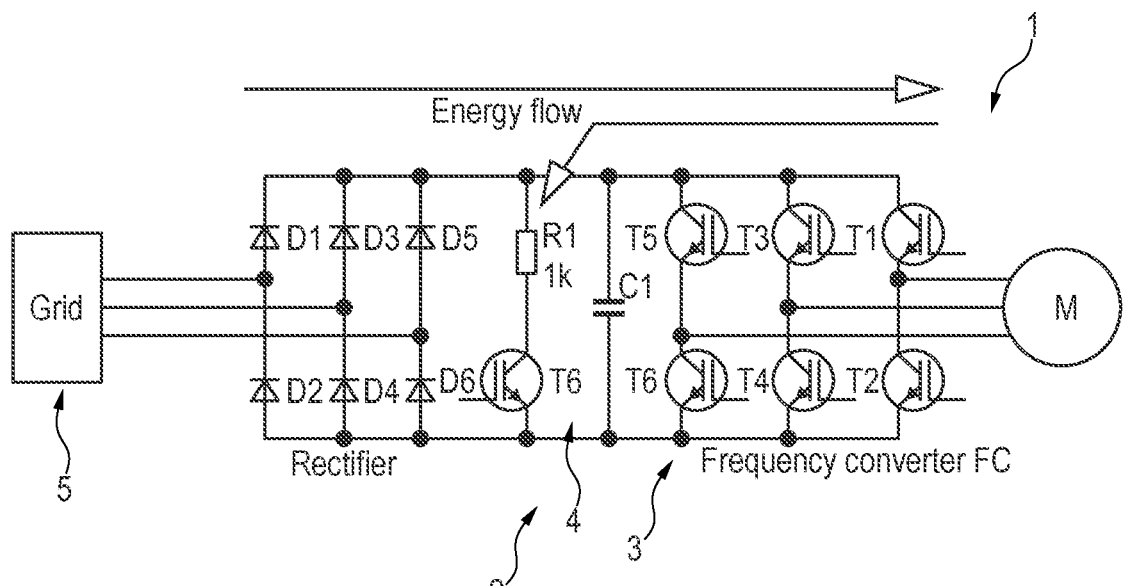
FIG. 6: a schematic representation of a drive system with a mains feed and an electric motor controlled via a frequency inverter, wherein the frequency inverter is supplied from a DC voltage intermediate circuit to which the energy storage device from FIGS. 1 to 5 can be linked.

FIG. 6. shows an example of a drive system 1 to which the energy storage devices in accordance with the exemplary embodiments of the present disclosure shown by way of example in FIGS. 1 to 5 can be connected. The drive system 1 can comprise an electric motor M which can be supplied via power electronics 2 from a current source or voltage source 5, wherein said current source 5 can be a mains connection or also a generator which can, for example be driven by a diesel engine, as is frequently the case with construction machinery. Said electric motor M can drive different adjustment units. They can, for example, as initially stated, be a hoisting gear and/or a travel drive of a lifting apparatus, for example in the form of a passenger and/or goods elevator of a building, or else in the form of a crane, in particular of a container bridge crane, or an actuating drive or a drive unit of a mobile construction machine such as a mobile mixer.

Figure 1:
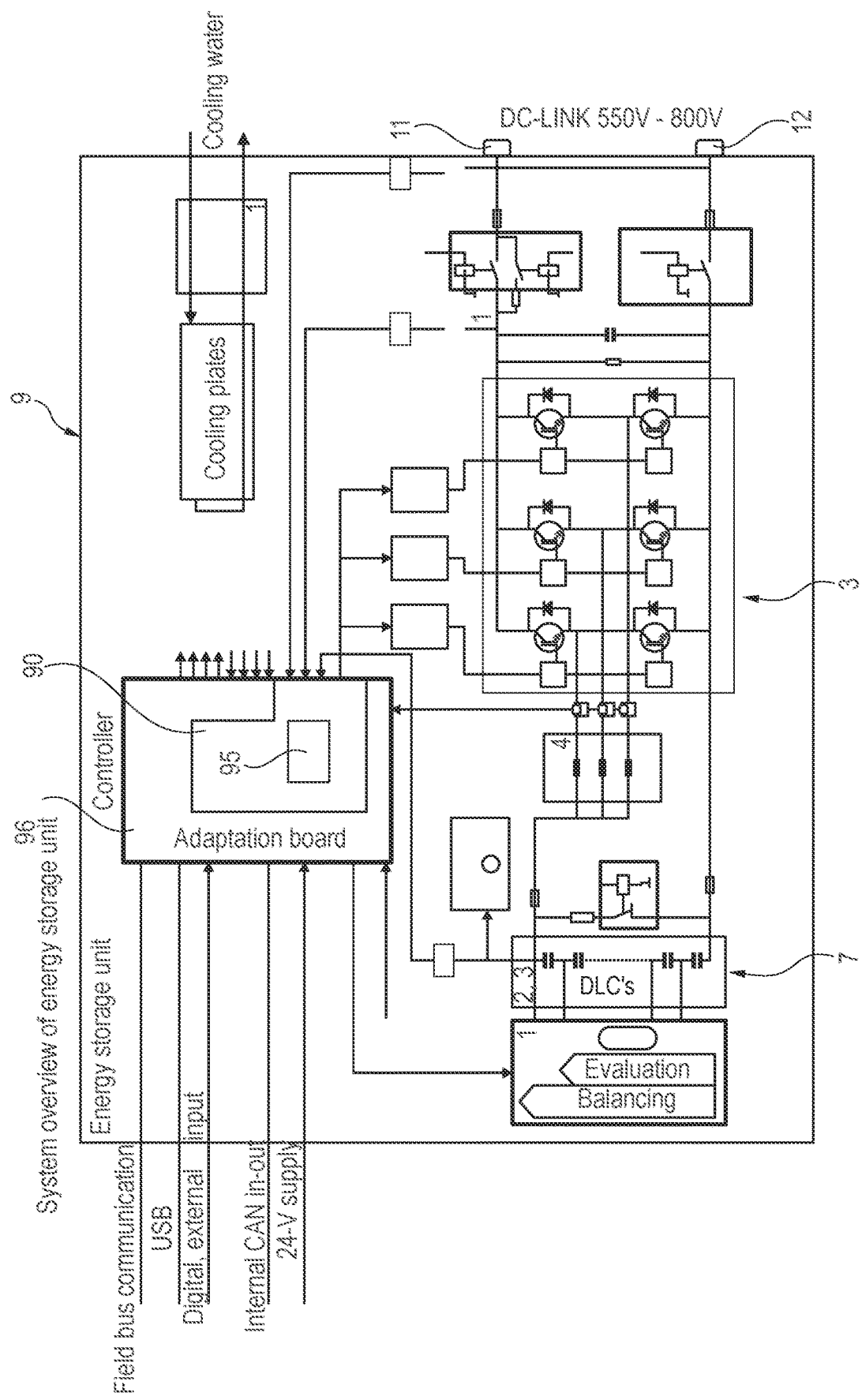
FIG. 1: a schematic representation of an energy storage device with a variably configurable control device in accordance with an advantageous embodiment of the present disclosure.
Figure 2:
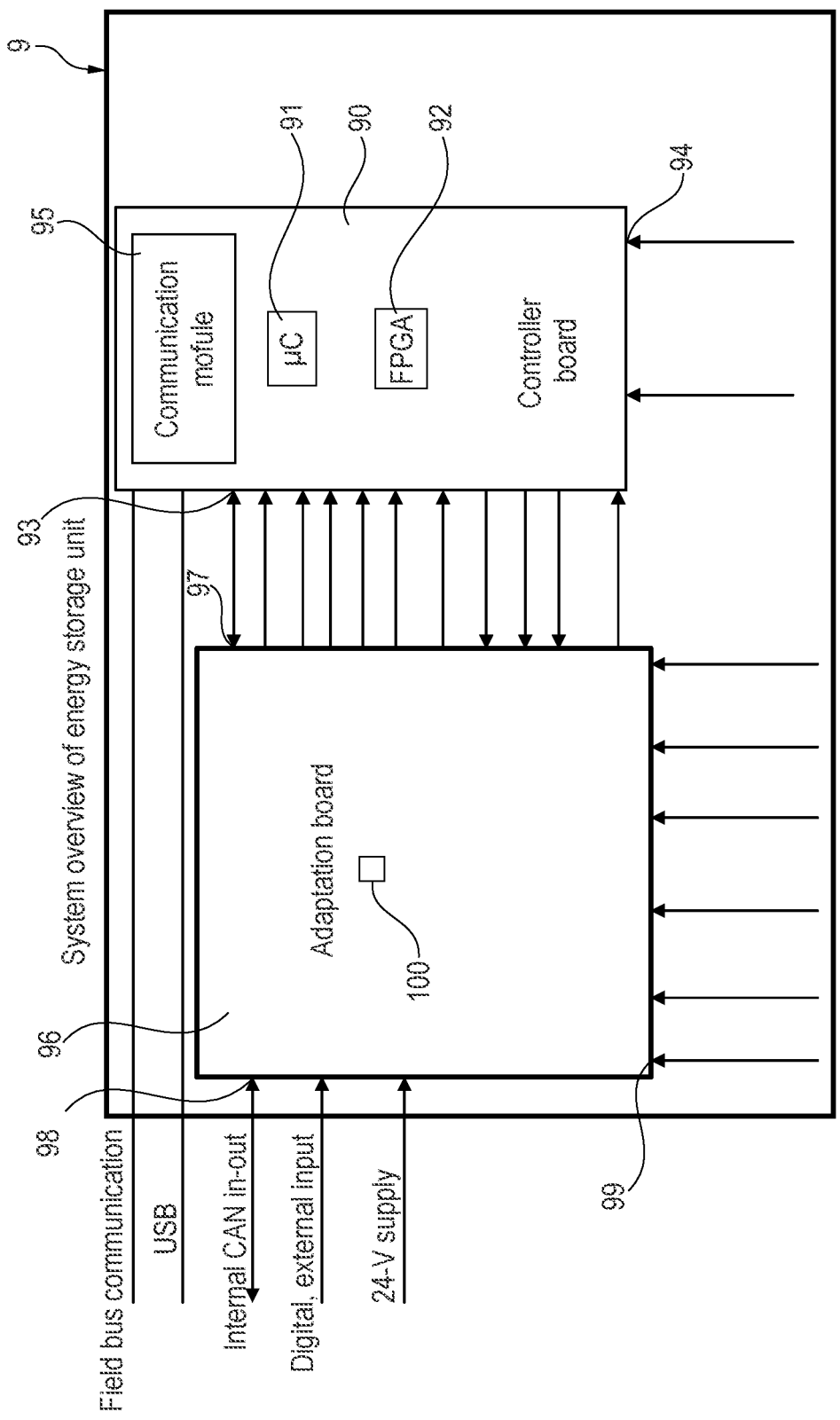
FIG. 2: a schematic representation of an energy storage device control device of FIG. 1, showing the controller board, the communication board attached to the controller board, and the adaptation board of the control device connected to the controller board.
Figure 3:
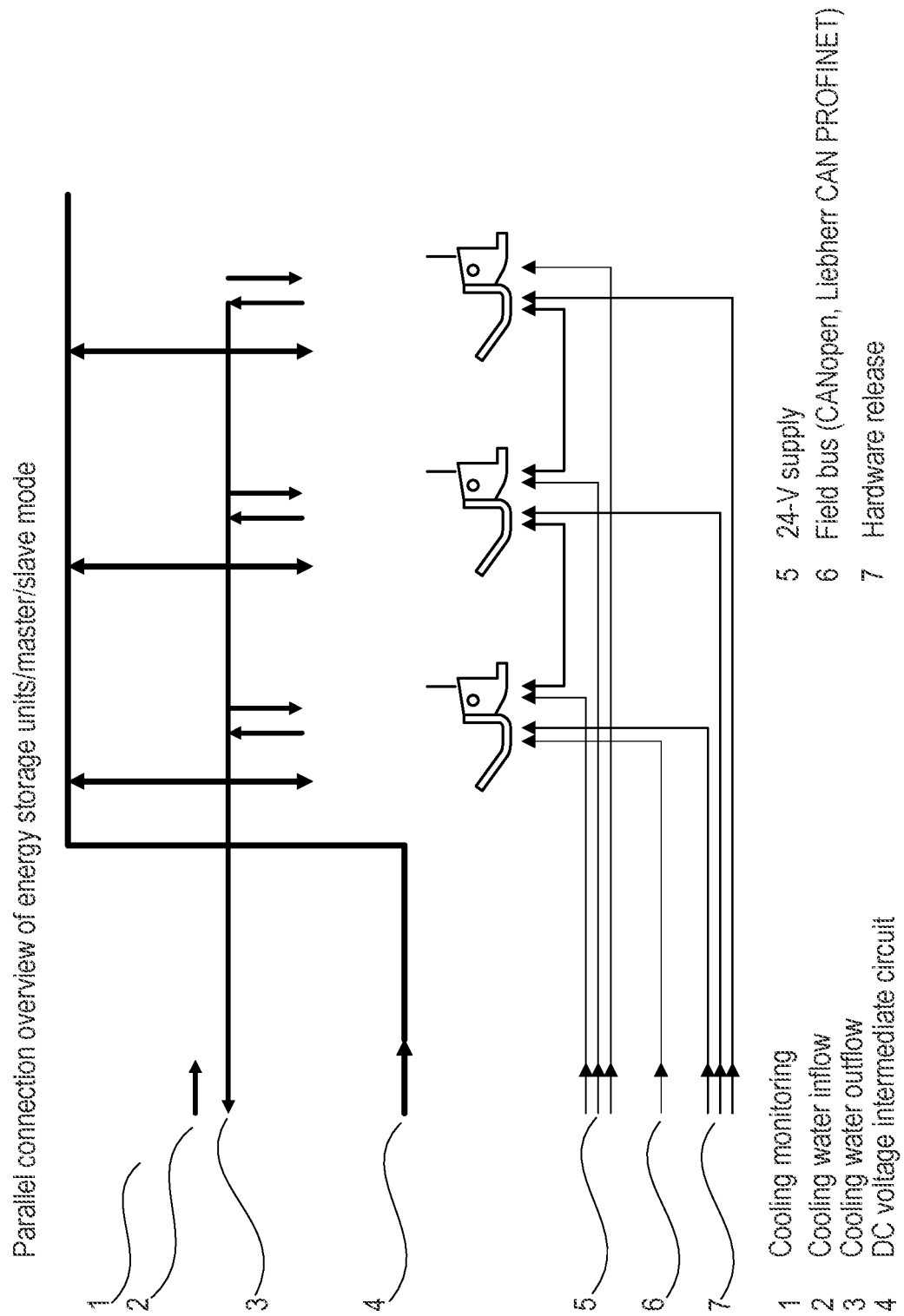
FIG. 3: a schematic representation of a plurality of energy storage units connected in parallel and controllable by the previously shown control device of FIG. 2 in a master/slave mode of operation.

As FIG. 6 shows, the power electronics 2 can comprise a frequency inverter 3 which controls and supplies the electric motor M. Said frequency inverter 3 can in turn be supplied from a DC voltage circuit or an intermediate DC voltage circuit 4 which is connected to the current source 5 and which can work as a rectifier. Said intermediate DC voltage circuit 4 can in particular comprise an intermediate circuit capacitor C1 to whose two voltage connections an energy storage device 6 can be connected, as is shown in FIGS. 1 and 2. The linking of the at least one storage block 7 of the energy storage device 6 can in particular take place via a DC/DC converter 8 which links the output voltage U2 of the storage block 7 to the voltage U1 of the intermediate DC voltage circuit 4, cf. FIG. 7.

When the electric motor M of the drive system 1 drives, energy is taken from the intermediate DC voltage circuit 4 and supplied to the electric motor M, wherein the subsequent supply of the energy from the current source 5 takes place via the mains rectifier which forms the left hand circuit part of the power electronics 2 in FIG. 6. If, however, the electric motor M brakes, energy is fed from the electric motor M into the DC voltage system. In conventional systems without any intermediate energy storage, this fed back energy, designated in FIG. 3 by the reference symbol R1, is typically destroyed to form heat, wherein such high-load resistors can be connected via the DC voltage system by means of electronic switches T5 to avoid any destruction of the power electronics by the fed back energy.

The energy storage system, which is connected, for example, to the connections of the intermediate circuit capacitor C1, now serves not to destroy the fed back energy from the intermediate DC voltage circuit 4, but rather to take it up and to make it available again at a later time. The energy store itself can in this respect be formed from different electric components which can be considered for this purpose. They can in particular be dual-layer capacitors or also battery cells or rechargeable batteries as are used in emergency power plants. For example, a storage block 7, which outputs a variable summed voltage depending on the cell type and the charge state, can be formed from a plurality of such cells—for example a plurality of dual-layer capacitors—by a serial connection and/or a parallel connection.

Figure 4:
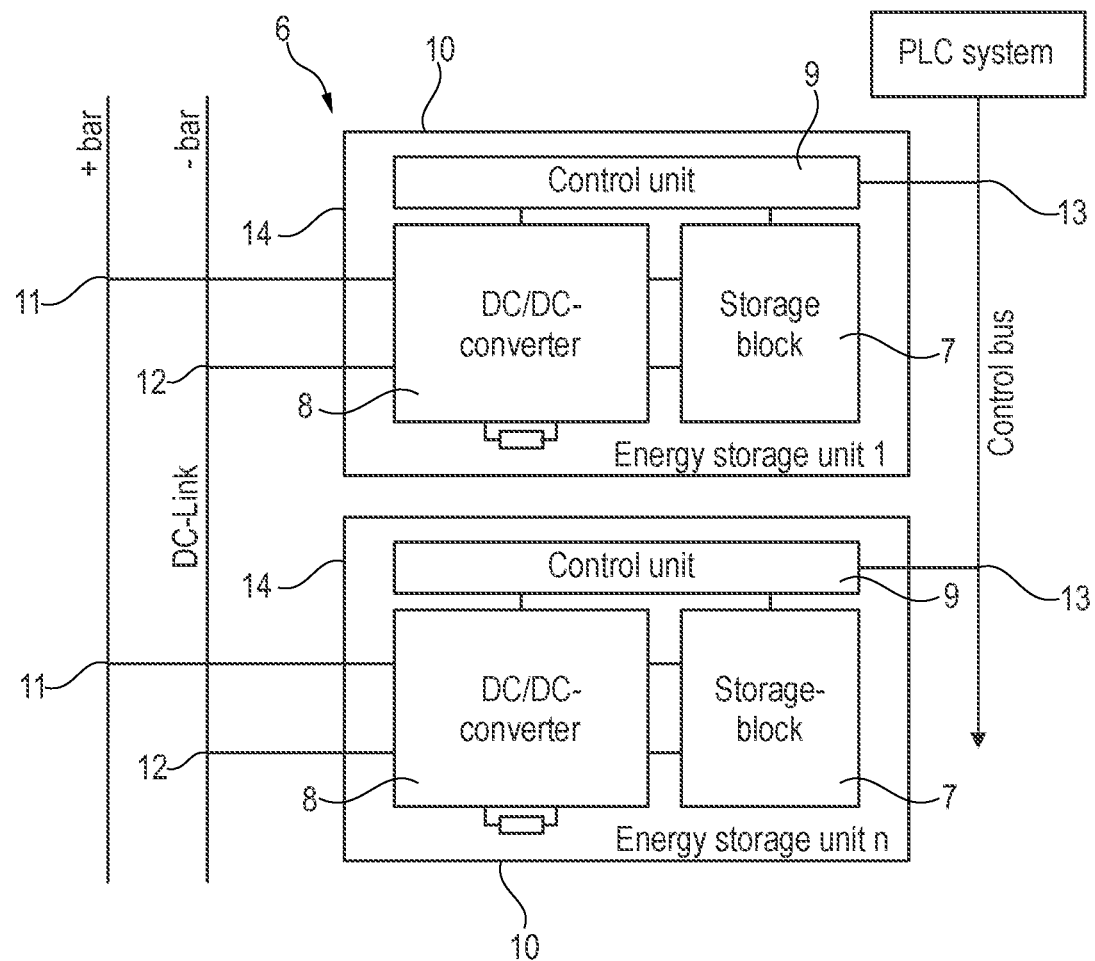
FIG. 4: a schematic representation of two energy storage units, which each comprise a storage block, a control device and a DC/DC converter integrated into a common housing, are arranged connected in parallel with one another and comprise control device communicating with each other and with a higher-ranking control as peers.
Figure 5:
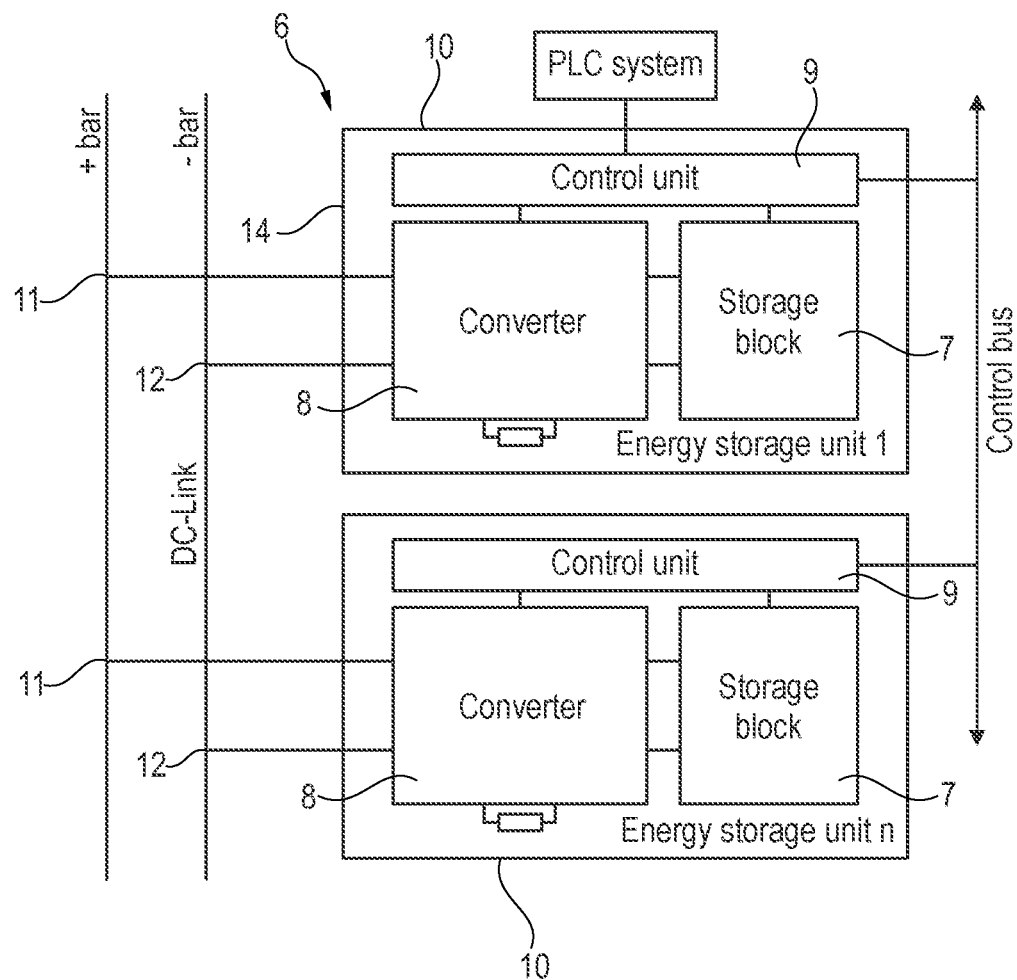
FIG. 5: a schematic representation of two energy storage units, which are arranged connected in parallel with one another, but unlike the embodiment in accordance with FIG. 4, the control device of the energy storage units act as master and slave units.

The circuit is now advantageously configured such that the maximum voltage of the storage block 7 is lower than the minimum voltage of the intermediate DC voltage circuit 4. As FIG. 4 shows, the output voltage U2 of the storage block 7 can be, for example, in the range from 250 to 500 V, whereas the voltage U1 over the connections of the intermediate DC voltage circuit 4 can, for example, amount to 650 V.

Figure 7:
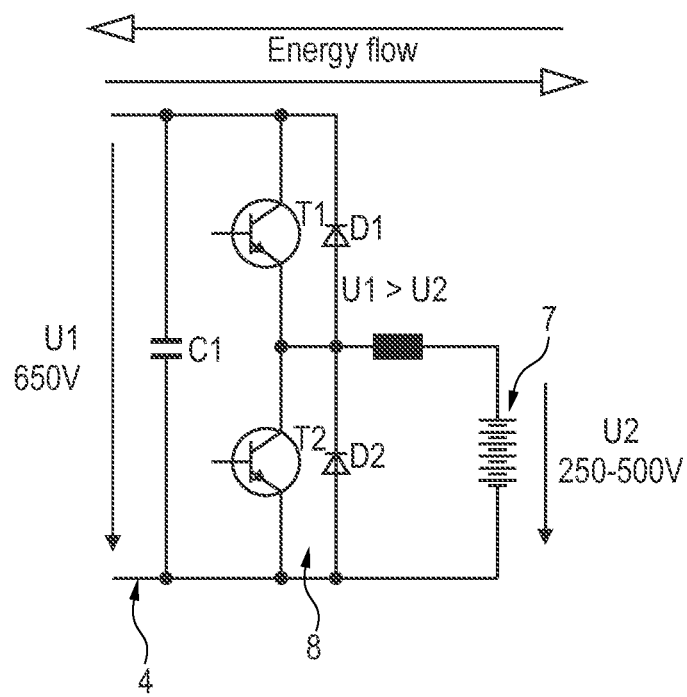
FIG. 7: a schematic representation of the link of the storage block of FIGS. 4 and 5 to the DC voltage intermediate circuit of FIG. 6 via a DC/DC converter.

The DC/DC converter 8 now connects the two voltage systems to one another, wherein the circuit of the DC/DC converter is able to transfer energy from the high voltage level into the low voltage level, which corresponds to a charging of the storage block 7, and also to transfer it in the other direction, which corresponds to the withdrawal or to an energy transfer from the storage block 7 into the intermediate circuit 4, cf. FIG. 7.

As FIGS. 1 and 2 show, the energy storage device 6 is advantageously characterized by a plug-and-play configuration so that the energy storage device 6 can be simply connected to the intermediate circuit 4 in the manner of a black box. In this respect, a respective storage block 7, which can, as mentioned, comprise a plurality of storage cells, for example in the form of dual-layer capacitors, is combined together with a DC/DC converter 8 and a control apparatus 9, which effects the energy management of the energy storage device, to form an energy storage unit and is integrated into a common housing 10 which, as mentioned, can be composed of different housing parts. Only two power connections 11 and 12, which can advantageously be configured as plugs, and signal line connections 13 are provided at the outer side of the housing 10 of an energy storage unit, via which signal line connections the control device 9 can communicate with a higher-ranking control PLC or the control device 9 of a different energy storage unit such as via a bus system. Furthermore, respective coolant connections 14 can be provided at the housing 10 of an energy storage unit to be able to connect a cooling circuit integrated into the housing 10 for the cooling of the storage block 7 and/or of the DC/DC converter 8 and/or of the control apparatus 9 to an external cooling circuit of the work machine.

As shown in FIGS. 1 and 2, said internal control device 9 of the energy storage device 6 can comprise a controller board 90 which controls and/or regulates various control functions of the energy storage device 6, in particular controlling said aforementioned DC/DC converter 8 and performing other control functions to be specified.

Said controller board 90 can thereby comprise a microcontroller 91 that can, for example, process one or more software modules that can be stored in a storage module which is not shown in more detail. Further, said controller board 90 can comprise a so-called FPGA device, i.e., a Field-Programmable Gate Array, cf. reference number 92 in FIG. 2.

Further, the controller board 90 advantageously comprises a plurality of hardware circuits to implement various control functions.

The control device 9 further advantageously comprises a communication board 95, which can be plugged onto said controller board 90 and can implement a fieldbus communication.

As shown in FIG. 2, said controller board 90 further includes a plurality of signal and/or supply connections that can be designed in the form of, for example, releasable connectors 93 for releasable connection to the adaptation board 96, which is yet to be described.

Further, the controller board 90 can have a plurality of inputs 94, for example in the form of plug-in contacts, for connecting various sensors.

The already mentioned adaptation board 96 of the control device 9 advantageously comprises several adaptation circuits 100, for example in the form of hardware circuits, by means of which received signals can be adapted and/or transformed and/or channeled and/or distributed, for example, in order to be able to adapt input signals of the higher-level or external system control of the drive device to the requirements of the integrated control device 9 and to transmit them to it and/or, conversely, to be able to adapt and/or transform control signals, operating data and/or recorded parameters from the internal control device 9 and/or to adapt them to the requirements of the external system control and to make them available to it in a suitable manner.

Said adaptation board 96 thereby advantageously comprises a plurality of interfaces 97, for example in the form of connectors, in order to be able to be connected to the controller board 90, in particular its plug contacts 93, in order to be able to exchange corresponding signals and/or commands and/or data between the controller board 90 and the adaptation board 96.

In addition to said interface connectors for the controller board 90, the adaptation board 96 can further comprise sensor connectors 99 for connecting various sensors that can be provided in the energy storage device 6 or also as external sensors on the drive device.

Said control device 9 comprising the controller board 90, the adaptation board 96, and the communication board 95 can be configured, in particular, to perform the following control functions and monitoring functions:
  State machine for the operation of the energy storage
    Automatic precharging of the internal intermediate circuit
    Automatic connection and disconnection to the external intermediate circuit
    Automatic precharging to initial voltage (parameterizable)
  Detecting of the various sensors:
    Voltage
    Current
    Temperature
    Rate of flow
  Generation of control signals for power electronics
  Regulation of current in the storage
  Various predefined modes of operation of the energy storage
    Regulation of the intermediate circuit voltage
    Regulation of the intermediate circuit voltage with desired value window
    Regulation of the intermediate circuit current
    Power regulation
    Regulation of the state of charge
    Active unloading of the storage
  Self-test of power electronics
  Limitations: (parameterizable)
    When voltage limits of storage are reached
    When current limits of storage are reached
    When current limits of intermediate circuit are reached
    When power limits of intermediate circuit are reached
    When temperature limits are reached
  Monitoring:
    Overcurrent in energy storage
    Overvoltage (intermediate circuit, voltage in energy storage and individual storage blocks)
    Overtemperature (cooling water, storage blocks, interior, chokes)
    Relay state
    Cooling (flow, cooling unit)
    power electronics
    Calculation of the expected remaining lifetime of storage
    Storage state by automatic measurement of the nominal storage data capacitance and internal resistance
    the balancing function of the storage cells
  Fieldbus communication to external systems
    Defining the mode of operation, start, stop
    Defining the desired value for the respective mode of operation
    Defining changeable limits during operation
    Pre-control value for the respective regulation or mode of operation
    Readout of current status of the energy storage device
    Readout of current operating data
  Saving statistical data in the controller
    Time distribution of storage temperature
    Time distribution of power
    Time distribution of current in storage
    Time distribution of voltage in storage
  Master/slave operation for parallel connection of up to 10 energy storage devices
    Communication between the energy storage devices via the CAN bus CAN internally
    Synchronization of the voltage of the different storage connected in parallel
    Uniform distribution of the current in the parallel-connected accumulators
  Transmission of energy storage operating data to a central server (cloud)
In the controller, the functionality can be changed via parameters.

The parameterization can be done via the USB interface or the Profinet interface and the PC program Opal.

The following functionalities can be adjusted via parameters:
  Communication parameters
  Parameters for power electronics (max current, Min-Max voltage, sensors, switching times, switching frequency)
  Operating mode (control via fieldbus or Connect&Use), master-slave mode, error response)
  Monitoring functions
    Threshold value for cooling, balancing function, voltage
    Threshold value for current and power Nominal data on storage (nominal capacity, nominal current, inductance, . . . )

Setting of the controller of different modes of operation

As FIG. 1 shows, a plurality of such energy storage units can be connected in parallel and can be connected in this configuration to the intermediate DC voltage circuit 4, wherein the outwardly leading power connections 11 and 12 can be directly connected in parallel, e.g. + to + and − to −. The mutually connected control apparatus 9 of the energy storage units communicate with one another via the control bus and in particular support the named parallel connection such that all the storage blocks of the units connected in parallel are automatically set to a uniform energy amount. The storage blocks 7 can in this respect each have a symmetrizing circuit which brings the individual voltages of the storage cells to a value which is as uniform as possible.

As FIG. 2 shows, the control apparatus 9 of the energy storage units connected in parallel can also communicate with one another in a hierarchical manner, wherein a control apparatus 9 acts as a master unit which controls the other control apparatus 9 acting as slave units, supplies them with control defaults and/or with direct control commands and communicates with the higher-ranking system control PLC.

The control apparatus 9 of the storage units can in this respect comprise the control and/or regulation means already initially described in more detail and can be provided with or connected to corresponding sensors, detection circuits or sensor circuits so that the energy storage device 6 or its energy storage units, which can be combined connected in a parallel, can carry out the likewise already initially explained functions.

We claim:

1. An energy storage device comprising:
   power terminals for connecting to a voltage circuit of power electronics of a drive system, which drive system can be controlled by an external system controller as well as at least one electrical storage block;
   at least one power converter for connecting the voltage circuit of the power electronics of the drive system to an internal voltage circuit of the storage block; and
   a control device for controlling the at least one power converter;
   wherein said control device has a controller board having an output and/or feed-in controller for controlling the power converter for the outputting of current from the storage block to the drive system and/or for the feeding of current from the drive system into the storage block and having a voltage closed-loop and/or open-loop controller for the closed-loop and/or open-loop control of the output voltage of the energy storage device;
   wherein the control device comprises:
      an adaptation board which is connected to the controller board, and wherein the adaptation board comprises a plurality of connection terminals (98) for differently designed external system controllers;
      at least one communication interface for communicating with the controller board of the control device; and
      at least one adaptation circuit for adapting and transferring signals between the connection terminals of the adaptation board and the controller board.

2. The device of claim 1, wherein the adaptation board comprises a plurality of differently designed adaptation circuits, of which a respective matching circuit adapts the respective required signals, data and/or parameters from/to the respective external system controller.

3. The device of claim 1, wherein the adaptation board further comprises a plurality of sensor connections for connection to different sensors providing sensor signals for the system controller and/or for the internal control device.

4. The device of claim 3, wherein the adaptation board is connected by said sensor connections to energy storage devices internal sensors by the storage block thereof and/or at least one operating state on the power converter and/or on the internal voltage circuit is monitored, and is connected to external sensors which monitor at least one operating state of the drive system to be connected or the power electronics thereof.

5. The device of claim 1, wherein the controller board comprises at least one microcontroller, at least one FPGA module, and hardware circuits.

6. The device of claim 1, wherein the control device further comprises a communication board configured to perform field bus communication for the control device with signal-providing and/or signal-processing components of the energy storage device and with signal-providing and/or signal-processing components of the external system controller of the drive device.

7. The device of claim 6, wherein the communication board has plug-in connections and is configured to be releasably plugged into the controller board.

8. The device of claim 1, wherein the communication board and/or the adaptation board comprise a field bus communication module for field bus communication to the external control system, wherein the field bus communication module defines a mode of operation of the drive device and/or defines starting or stopping of the drive device and/or defines a desired value for a respective mode of operation of the drive device and/or defines variable limits during an operation of the drive device and/or defines a pre-control value for a regulation of the drive device and/or mode of operation of the drive device.

9. The device of claim 1, wherein the controller board comprises an operation control instruments for setting and controlling different modes of operation of the energy storage device, wherein the operation control instruments comprise at least one controller for closed-loop control of an intermediate circuit voltage and/or a controller for closed-loop control of an intermediate circuit voltage with desired value window and/or a controller for closed-loop control of an intermediate circuit current and/or a controller for closed-loop control of a power and/or a controller for closed-loop control of a charge state and/or controller for active discharging of the storage block.

10. The device of claim 1, wherein the controller board comprises a self-test module configured to self-test the power electronics.

11. The device of claim 1, wherein the controller board comprises at least one parameterizable limiter module configured to control the controller board when a storage voltage limit is reached, which can be variably definable by parameterizing the limiter module, and/or when a storage current limit is reached, which can be variably definable by parameterizing the limiter module, and/or when an intermediate circuit current limit is reached, which can be variably definable by parameterizing the limiter module, and/or when an intermediate power limit is reached, which can be variably definable by parameterizing the limiter module, and/or when a temperature limit is reached, which can be variably definable by parameterizing the intercepting module, to limit or change at least one characteristic manipulated variable of the energy storage device and/or the drive device, in particular to limit or reduce an output or fed-in current and/or a voltage level.

12. The device of claim 1, wherein the controller board comprises at least one monitoring module which is configured to monitor an over-temperature in the cooling water of a cooling device and/or in the at least one storage block and/or in an interior of the energy storage device and/or at at least one choke, and/or a state of at least one cooling device relay and/or a flow of coolant and/or a cooling unit state and to limit or change at least one characteristic manipulated variable of the energy storage device and/or the drive device as a function of the monitored variable.

13. The device of claim 1, wherein the controller board comprises at least one monitoring module configured to monitor a balancing function of the storage blocks and to control at least one characteristic manipulated variable of the energy storage device as a function of the monitored balancing.

14. The device of claim 1, wherein the controller board comprises a master/slave controller configured to operate a plurality of storage blocks in a master/slave mode, wherein the master/slave controller comprises a communicator for allowing a plurality of parallel-connected energy storage units to communicate with each other via a CAN BUS, and a synchronizer for synchronizing the voltage of the plurality of parallel-connected energy storage units, and apportioning a controller for equal apportioning of the current in the parallel-connected energy storage units.

15. The device of claim 1, wherein the controller board comprises at least one parameterization module for parameterizing and/or variably setting at least one of the following functionalities:
at least one communication parameter;
at least one parameter of the maximum current, a minimum and/or maximum voltage, at least one sensor, at least one switching time and/or at least one switching frequency of the power electronics;
at least one of the control mode via a field bus and/or master/slave mode and/or error reaction mode,
at least one of defining a limit value for a cooling device and/or a balancing function and/or a voltage, and/or at least one threshold value for current and power of the energy storage device and/or the drive device,
nominal values of the nominal capacity and/or nominal current and/or inductance of the energy storage device,
a setting of at least one controller.

16. The device of claim 1, further comprising at least one DC/DC converter configured as a power converter for connecting a DC voltage intermediate circuit to the internal voltage circuit of the at least one storage block, wherein said DC/DC converter is bidirectional and the control device comprises output and feed-in controllers for controlling the DC/DC converter both for outputting of current from the storage block to the DC voltage circuit and for feeding of current from the DC voltage circuit into the storage block.

17. The device of claim 1, wherein the storage block comprises at least one dual-layer capacitor for energy storage.

18. A drive system having at least one electric motor which is fed via power electronics, wherein the power electronics are connected via a voltage circuit to a voltage source, and wherein the drive system further comprises at least one energy storage device of claim 1, wherein the energy storage device is configured to buffer energy fed back from the electric motor, and wherein the energy storage device is connected to the voltage circuit.

19. The system of claim 18, wherein the system is configured so that a maximum voltage of the at least one storage block of the energy storage device is kept lower than a minimum voltage of the DC voltage circuit.

20. The system of claim 18, wherein both feeding of fed back energy of the electric motor into the energy storage device and outputting of buffered energy from the energy storage device to the DC voltage circuit takes place via the DC/DC converter of the energy storage device.

21. A lifting apparatus, wherein the lifting apparatus comprises a passenger and/or goods elevator of a building, and further comprises the system of claim 18.

\* \* \* \* \*